July 9, 1935.  W. D. LA MONT  2,007,540
PROCESS OF AND APPARATUS FOR GENERATING STEAM
Filed Aug. 10, 1931  3 Sheets-Sheet 1
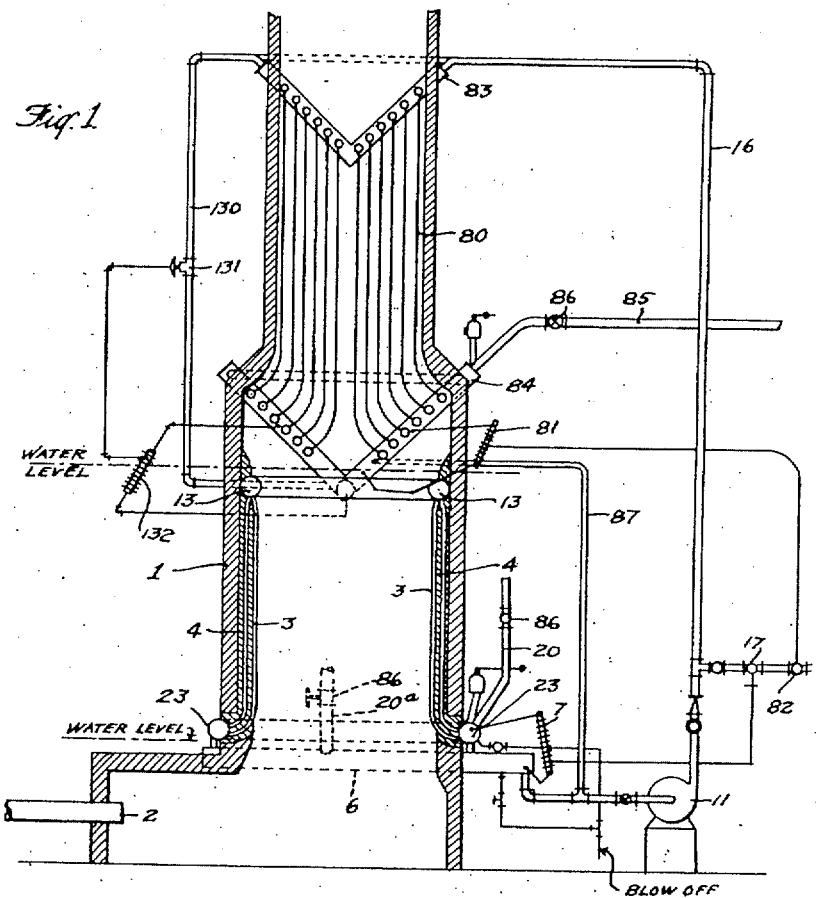
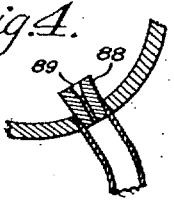
INVENTOR
WALTER DOUGLAS LAMONT
BY  ATTORNEY Patented July 9, 1935

2,007,540

UNITED STATES PATENT OFFICE 2,007,540

PROCESS OF AND APPARATUS FOR GENERATING STEAM

Walter Douglas La Mont, North Colebrook, Conn., assignor to La Mont Corporation, New York, N. Y., a corporation of New York Application August 10, 1931, Serial No. 556,183
In Germany December 22, 1926

37 Claims. (Cl. 122—39)

his invention relates to an apparatus for generating steam and particularly to a steam generator in which there is a positive and controlled ly of water to the steam generating elements.

invention relates more especially to steam erators in which the heat for steam generation is received by the elements in part under the on of radiant heat in a heat chamber and in under the action of the heat of heating gas ing thereover.

eat chambers and furnaces of all types, both the combustion of fuel therein and for the inement of heat delivered thereinto by hot s or other materials or produced by electric ns, have heretofore presented serious problems of heat insulation and protection of the confining walls from the action of the gases or other erials of high temperature and from the derating action of the radiant heat present or ved in the furnace. Especially in furnaces tructed in connection with steam generators he combustion of fuel to provide the heat for m generation, attempts have been made tofore to provide protection of the refractory erials of which the confining walls and structures are usually made either by the building into walls themselves or by the placement adjato the wall but within the furnace, so as to ld the wall from the direct action of the rait heat, of water tubes and especially tubes nected to the water space of the boiler with purpose of providing circulation of the water ugh said tubes sufficient to permit steam ration within the tubes. Such tubes have tofore been arranged in the conventional er with the intention and purpose of permitthe so-called convection action of the heated er and the mixture of steam and water withhe tube to produce a circulation of water ugh the tube, which water is drawn from the er space of the boiler through suitable connions exterior to the heat chamber and the ed water or mixture of steam and water is n delivered to the water space of the boiler. hile the aim and purpose of such arrangets have been to provide an adequate circulaof water through the tubes subjected to rat heat, it has been found that the severe conns under which steam is generated in such ngements has prevented the securing of er delivery of water to the tubes and circun of water therethrough. These severe conns are for the most part caused by the exely high rate at which radiant heat is reed by the surface of the tubes exposed thereto in a heat chamber. The steam generation within the tube is therefore extremely rapid and the volume of steam formed, being many times the volume of the water from which it is evaporated, occupies a large part of the space within the tube. As no provision has been made in such conventional arrangements for the easy flow of steam through the tube and its uninterrupted discharge therefrom and as it must travel upward through the tube and against the water which tends to remain in the tube under the hydraulic pressure of the water level of the boiler, the steam in its rapid expansion tends to force the water from the tube more rapidly than the convection action described can deliver the water to the lower end of the tube. The result is that the inner surfaces of the tube may be left uncovered with water, overheating of the metal upon which the radiant heat continues to fall may then occur, and ultimate rupture of the tube will result. In addition, the solids contained in the water are deposited upon the tube surface and may become dried thereon and thereby assist the burning action. Moreover, no special attention has been heretofore given to the relation of the flow of water through the parts of the boiler which are subjected to radiant heat in relation to the flow of water through the parts which absorb heat from the heating gases and certain advantages which it is possible to obtain with certain arrangements of steam generating elements in relation to these two sources of heat have not been realized. All these conditions set limitations upon the capacity, flexibility of operation, safety and efficiency of steam generation under radiant heat in the so-called water wall or water wall boiler.

It has been attempted heretofore to meet some of these conditions in so-called convection circulation boilers by inserting propeller wheels or devices to induce a flow of water in the desired direction and pumps have been variously arranged with the purpose of producing the proper flow through tubes exposed to radiant heat. In all these, however, the problem presented due to the different conditions of steam generation in different tubes or at different points in the same tube or in different sections of the boiler or of the steam generating apparatus has not been appreciated.

It is, therefore, broadly the object of the present invention to provide for operation of water walls and for generating steam by use of radiant heat in such a way as properly to meet these conditions and to provide for steady and continuous circulation of the water through the water passages or tubes of the water wall or water wall boiler. The combination of such water walls or radiant heat absorbing surfaces with steam generating surfaces exposed to the heat of heating gases constitutes more particularly one of the important objects of the present invention.

It is a further object of the invention to provide for the proper flow of water through different or through separate parts of the steam generating apparatus and in such relation to the steam generated in said parts or to the conditions of steam generation therein that an adequate flow of water may be maintained through each part and in suitable relation in one part relative to the other.

It is a still further object of the invention to provide for control of the amount of water delivered to or flowing through the different parts and to control the conditions under which it flows so as to accomplish the proper delivery to and flow through the different parts of the steam generating apparatus to suit the conditions of steam generation in said parts.

In my co-pending application for U. S. Letters Patent Serial No. 77,816, filed December 26, 1925, of which application the present application is a continuation in part, and in my co-pending application for U. S. Letters Patent Serial No. 530,228, filed April 15, 1931, which application also is a division and a continuation in part of said application Serial No. 77,816, filed December 26, 1925, I have disclosed and claimed broadly the process of generating steam and the apparatus for carrying out said process in which the water for steam generation is positively delivered into heat exchanging relation with a source of radiant heat in a plurality of paths of water flow and in which the water is apportioned in the several paths in proper relation to the steam generating conditions under radiant heat to which it is subjected in flowing in said paths. The present application is concerned with the process of generating steam and the apparatus for carrying out the process which utilizes the features of said applications Serial No. 77,816 and Serial No. 530,228, but is more especially concerned with the application of these processes and the utilization of this apparatus in the manner embodying features more specifically disclosed in my prior application Serial No. 77,816.

In my prior U. S. Reissue Letters Patent 16,895 I have disclosed a steam generator in which the water to be converted into steam is introduced into the upper end of a steam generating tube in quantity greater than can be converted into steam in its passage through the tube but less than sufficient to tend to fill the cross section of the tube as it gravitates through the tube, both the water and the steam being discharged from the lower end of the tube and provision being made outside the tube for separating the steam and the water and continuously returning the separated water to the upper end of the tube. In the construction disclosed in said Reissue Letters Patent gravity is employed as the primary force to cause the flow of water through the steam generating tube and cause a film of water to be extended upon the inner surface of the tube, the outer surface being exposed to the steam generating heat.

In my application for U. S. Letters Patent Serial No. 209,024, filed July 28, 1927, I have disclosed a method of steam generation in which the advantages obtained by the method of steam generation and the steam generator construction described in said reissue Letters Patent can also be obtained with a steam generating tube in which water must flow through at least a part thereof without the aid of or against gravity. To carry out the steam generating process in such a generator with tubes so arranged, I provide a continuous unidirectional movement of steam and water through the tube toward a common discharge end by an adjustment, in relation to the steam generated in the tube, of the rate of delivery of water to the tube under the action of a forcing means, such as a pump, and by providing a tube of such diameter or internal cross sectional area in relation to said rate of steam generation and said rate of water delivery that while space is left for the steam within the tube a high velocity of steam flow is provided which is utilized to carry the water through the tube, contacting with the walls thereof, without interference with the steam flow by the water and without interference with the water flow by the steam flow.

I have found that steam generating tubes or elements of the type of my prior Patent 16,895 and of the type disclosed in said application Serial No. 209,024 may be used with particular advantage when exposed to radiant heat for the protection of walls of furnaces and for the purpose of steam generation. However, I have discovered that special conditions must be taken into account in the use of tubes when generating steam under the action of radiant heat. The present invention broadly is concerned with provisions for meeting these special conditions and more particularly is concerned with meeting them in combination with the conditions of steam generating under the action of the heat of heating gases, especially in tubes or elements which have their extent in such relation to the two sources of heat that the flow of water therethrough is successively over surfaces subjected to one and then the other source of heat. Moreover, I have discovered that these novel provisions are capable of practical application whether tubes of the type of my prior Patent 16,895 or those of my application Serial No. 209,024 be used or whether steam generating tubes be operated in the manner of so-called "full" tubes.

A "full" tube, in the sense in which the expression "full" has been applied by me to steam generating tubes, may be defined as a tube in which the amount of water present (in the tube in relation to the amount of steam generated therein) is not so limited that the water does not occupy a large part of the space within, or of the cross sectional area of, the tube, or is not so limited as not to produce "hydraulic" reaction within the tube. "Full tubes", therefore, may be said to be tubes in which the water occupies a large space within the tube and the steam may be said to be dispersed in the water rather than that the water is dispersed in the steam as in the tubes of my prior patent and application. "Full tubes" may receive the water to be evaporated by the so-called "convection circulation" mentioned above or the water may be delivered thereto by a positive means such as a pump or under the pressure of a head of water to cause the flow of water into the tubes. The present invention is concerned only with positive delivery of the water, but tubes operating in the various gradations from "full" tubes to "film" tubes, i. e., those "less than full", inclusive, are contemplated as being within the scope of the invention.

The conditions of steam generation under radiant heat referred to are in part due to the large volume of steam rapidly generated within the tube subjected to radiant heat and in part due to the resistance to flow of water and steam through the tube and in many cases to the resistance offered to the flow of water due to gravity when the water must run upward through the tube or connections therefrom to reach the steam and water separating space. The large volume of steam, which in some cases in practice may be as much as 200 times the volume of the water from which it is evaporated, tends to expand within the tube and thereby displace the water in the tube, i. e., to "gulp" it therefrom, and thus prevent the entrance of water thereinto. Furthermore, the flow of steam through the tube requires a pressure drop and there is thus set up a resistance or back pressure to the entrance of water into the tube. The flow of water through the tube similarly requires the expenditure of force to overcome resistance, which force acts against the entrance of water into the tube. Such forces, therefore, prevent the proper delivery of water to the tube and its flow therethrough unless suitable provision is made for positive delivery of the water to the tube and for forcing it into the tube and unless the quantity entering each tube is properly controlled in relation to the conditions of steam generation in the tube.

Whether tubes of the type of my prior patent Re. 16,895 or of my application Serial No. 209,024 be used or whether "full" tubes be used, the tubes receiving radiant heat may be subjected to different degrees of the radiant heat because of their positions within the heat chamber or furnace or their positions in relation to the source of heat or because of other conditions. It therefore becomes necessary properly to control the delivery of the water into each tube so that an adequate amount of water will be delivered in relation to the steam generated in the tube and under such pressure at the inlet end of the tube that the "back pressure" and the resistances mentioned above will be overcome and the flow of water through the tube and its flow in contact with the heating surfaces thereof will be continuously maintained so as to keep the tube surfaces wet and thus prevent burning.

Moreover, when tubes receiving radiant heat are operated in connection with steam generating surfaces absorbing heat from heating gas or when such tubes individually are subjected to both radiant heat and the heat of heating gases it becomes necessary or of advantage so to relate the flow of water to and over the surfaces or over the portions of the tubes subjected respectively to the heat of the different sources as to insure for each surface or for each portion of the tube so subjected a proper or an adequate amount of water. The insuring of this relationship of the water flow to the heat to which it is subjected may be facilitated when the flow of the water is in series over the surfaces subjected to the heat from the different sources. When water in excess of the steam generation is delivered to such surface or to such tubes, the excess water passing out of heat exchanging relation with one source of heat may be delivered into heat exchanging relation with the other source of heat. With such arrangements it is possible to combine the water delivered to the surface subjected to one source of heat with the water to be subjected to the other source of heat.

meet the structural conditions of the furnace as well as other conditions, such as the impingement of the fuel or of the gases upon the wall of the furnace or upon the tubes, various sizes of tubes both as to diameter and as to length may be required and that tubes of various wall thickness may be used for different operating steam pressures or for proper mechanical strength or to provide a proper amount of material for stiffness or mechanical wear or abrasion. Such differences in dimensions in themselves may cause differences in the amount of heat absorbed by the tubes as well as in the resistances and other conditions of steam generation within the tubes. While the selection of the particular size of tube and its arrangement within the furnace is within the skill of the engineer, my invention provides for the apportionment of the water to the various tubes or to the various portions of the heating surface or to units of heating surface or sets of tubes in accordance with the steam generating conditions to which said tubes or surfaces or units or sections are subjected.

Moreover, in the utilization of tubes of such length as to extend through the furnace or along the walls thereof and into a gas passage leading from such a furnace, whereby such tubes are subjected to radiant heat as well as to the heat of the heating gases passing from the furnace, while offering the advantage that the water required for steam generation in both portions of the tube may be supplied through one end of the tube and thereby may be in quantity in excess of the steam generation in at least one of the portions of the tube and preferably in excess of the steam generation in both portions thereof, which feature is one of the features of the invention of the present application, the apportionment of the water to such tubes or the control of the delivery of the water thereto is of advantage in insuring the proper operation of the tubes and preventing the burning of the heating surface as above described.

In the utilization of steam generators having the heating surface thereof divided into separate parts and in which some of said parts are subjected to radiant heat and others are subjected to the heat of heating gases, the water delivered to one of the parts of the steam generating surface may be delivered thereto in excess of the steam generated on said surfaces or in excess of the steam generated in the steam generating apparatus and the excess water discharged from said part of the steam generating surface may be delivered to another of said parts of the steam generating surface. The water delivered to said parts of the steam generating surface, including the excess water delivered from one to the other, may be caused to flow over the steam generating surface and may be advantageously apportioned to said parts in the manner described above properly to supply the parts of the steam generating surface with the water for steam generation. Moreover, I have found that a control of the amounts of water delivered to said parts of the steam generating surface may be effected by suitably relating the amount of water delivered to one of said parts of the steam generating surface to the excess water delivered from said part of said surface to another part of said steam generating surface or to the steam generated in said other part. Other relations of the water delivery to the separate parts of the steam generating surface will be understood from the more In the preferred embodiment of this invention I utilize tubes of the type described in my prior Patent 16,895 or of the type disclosed in my co-pending application Serial No. 209,024. However, in the steam generators of the present invention, including the so-called water walls and water wall boilers having tubes for the generation of steam in connection with a combustion chamber and including steam generators having tubes for absorbing the heat of heating gases, and especially in the combinations of these two types of steam generators which form one of the principal features of the invention of the present application, whether using the tubes of my prior patent or of my application or whether using the so-called "full" tubes, the apportionment of the water in accordance with the amount of steam generated within each tube and its delivery under suitable conditions of pressure and velocity, as well as its delivery in amounts suitably related to the steam generation in the separate parts of the combination of steam generating surfaces, are important to properly supply all the steam generating surfaces with water to maintain the steam generation and to prevent the surfaces from becoming dry with consequent burning and rupture.

In the above and following discussions reference is made to delivery to the tubes or heating surface of a proper or suitable or adequate amount of water in excess of the steam generating capacity of the tube or heating surface. By these terms is meant an amount or quantity of water which while in said excess relation is, however, so limited or controlled that whether the tube or heating surface element is operating as a "full tube" or "film tube" there will be no substantial "gulping" of the water from the tube with the result that the surface thereof is left dry and subject to the possibility of burning.

In applying the broad principle of the invention, while other means such as disclosed hereafter in connection with this invention may be used, I have found it advantageous in many cases to utilize an orifice at the entrance to each tube through which the water is caused to flow and thus to measure the amount of water entering each tube so as to deliver into each tube such an amount of water in relation to the total amount of water delivered to all the tubes that each tube receives its proper share of the water. In the use of the orifice or other restricting means it is also possible to provide such a pressure drop therethrough under the action of the positive circulating means, for example a pump, that the back pressure created within the tube and the other resistances acting against the flow of water into the tube may be overcome and the continuous supply of water in the desired amount may be maintained. The orifices which I may use in the present invention may be similar to those disclosed in my prior patent and application. While in said patent and application the function of these orifices is to limit the water so that the tube will receive an amount of water less than sufficient to fill it, the function of the orifice or an equivalent means in the present invention may be to properly apportion to the respective tubes, to which the water is delivered in parallel, such an amount of water in relation to the total amount of water so delivered that each tube will receive its proper proportion of the water in relation to the steam generated and with due consideration for the particular steam generating conditions within the tube. When, therefore, tubes of the type of my prior patent or of my prior application hereinabove identified are utilized for steam generation under radiant heat conditions, as in the present invention, the orifice serves not only for limiting the quantity of water delivered into the tubes to leave space for the steam but in relation to other similar orifices further serves to meter the water delivered to the respective tubes. Thus there may be insured delivery to each tube of a quantity of water in accordance with its conditions of steam generation and preferably in excess of its steam generating capacity but less than sufficient to fill the internal cross sectional area thereof.

It will be understood that my invention is not limited to a particular type of tube or to its method of operation nor to a particular placement of tubes in respect to the heat falling thereon nor in respect to the direction of circulation of water therethrough. Since the water is delivered positively to the heating surface or to the inlet ends of the tubes, the tubes may be placed in any position relative to the walls or to the source of heat or to the heating gases and may be bent to extend along two or more walls or in any desired relation to other portions of the furnace or boiler structure and may be bent to enter the gas passage and extend therethrough. A proper delivery and apportionment of the water, preferably in excess of the steam generating capacity of the heating surface subjected to the radiant heat and that subjected to the heat of the heating gases, is accomplished in accordance with the present invention. Preferably means such as orifices or other restricting means are used so that the positive delivery of the water to the tubes is effective to carry the water into each tube or to each section of the heating surface in excess relation, which orifices may also be used to limit the water entering the tube as above described.

When the heat distribution in a heat chamber is asymmetric so that certain walls or certain areas of walls or certain tubes or certain portions or units of the heating surface may receive a much greater amount of heat than other walls or areas or surfaces, an asymmetric arrangement of water tubes or an asymmetric operation of these tubes or surfaces, or both, in the manner described in my co-pending application Serial No. 530,228 may be used, whereby the water circulation in quantity or velocity or both is to be apportioned according to the heat delivered to the various portions of the walls or heating surfaces. The circulation of the water, not only for the tubes subjected to radiant heat but for those absorbing heat from gases, may be effected from a single water circulating means such as a pump, or a plurality of pumps may be used and suitable arrangements of pipes and connections may be provided to deliver the water to the respective tubes or heating surfaces or to the separate parts thereof. Control of the water delivered to the various portions of the heating surface may also be effected by valves or by selection of the capacity and operation of the pumps delivering the water to these different sections. Means may be provided which are actuated in proportion to the evaporation or the heating in particular sections so as to control or to vary the speed of circulation or the amount of water delivered to the respective sections. Such control means may also be adapted to provide for operation of different portions or sections at different pressures.

Various arrangements and modifications may be made within the spirit of the invention and those shown in the drawings and the more detailed description to follow are merely typical. They illustrate some of the many possible combinations included within the scope of the invention and in no sense are to be taken as limiting the invention.

Fig. 1 is a diagrammatic section through a furnace having tubes adjacent its walls and a boiler for absorbing the heat of the gases from the furnace.

Fig. 4 is a cross section of a part of a water inlet header to which are connected tubes provided with water inlet orifices.

Figure 2:
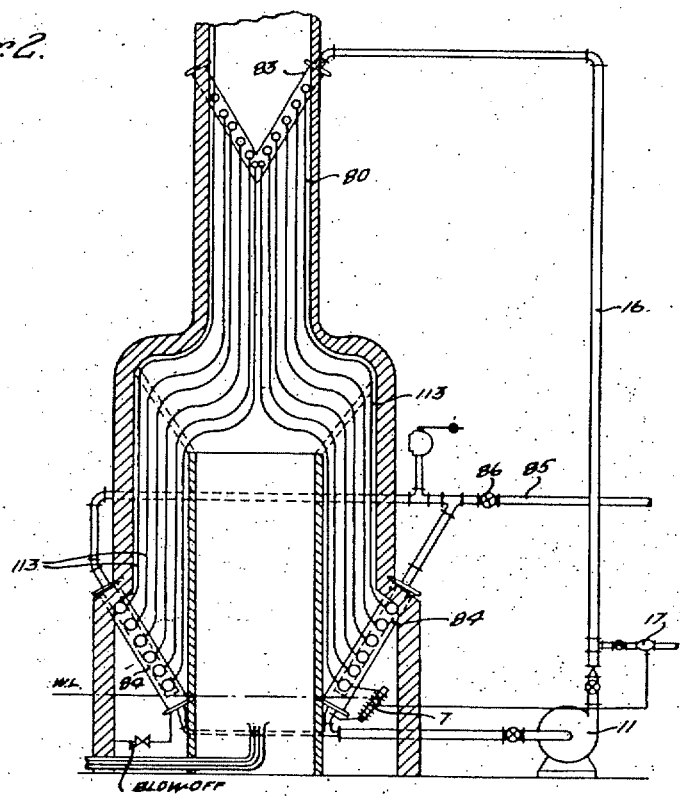
Fig. 2 is a diagrammatic section of a combination of a furnace having tubes arranged to absorb radiant heat and bent to form a bundle of tubes to absorb the heat of the gases from the furnace.

Fig. 1 shows a furnace in which tubes for steam generation are arranged in relation to the walls of the furnace for absorption of the radiant heat produced by the combustion of fuel within the furnace. The furnace walls are shown at 1 and the fuel burner at 2. Two sets or layers of steam generating tubes are shown, one layer being embedded in a lining upon the furnace wall. The tubes 3 are shown just inside and against the wall of the furnace, while the tubes 4 are shown arranged behind the tubes 3 and within the lining upon the wall. The arrangement of the tubes in relation to the wall and in relation to each other may be varied to meet different conditions. Connected to the tubes at their upper ends are water inlet headers 13. At their lower ends the tubes are connected to headers 23 from which the steam generated within the tube is discharged together with any excess water. A steam and water separator 6, connected by suitable pipes to the lower headers, receives the steam and water discharged from the headers and separation of the steam from the water may be effected therein. The steam may be discharged to the place of use through the discharge pipe 28a or through the pipe 20 controlled by the valves 88 and 88a. The water collected in the separator or receiver 6 is drawn by the pump 11 and forced through the pipe 16 to the upper headers 83, preferably in quantity in excess of the evaporation within the tubes 3 and 4 and in the tubes 80, the excess water from the tubes 80 being delivered to the tubes 3 and 4 and being again discharged to the reservoir 6 as described above.

Provision is made, in accordance with the present invention, to deliver water to these different layers or sets of tubes and to the different sections in accordance with the amount of steam generated therein. The pump 11 delivers water in quantity in excess of the steam generating capacity of the steam generating apparatus and in accordance with the invention this water may be delivered and apportioned to the different sets of tubes or the different sections in quantity in excess of the steam generated in each tube or section. The different conditions of back pressure and resistance and the different amounts of steam generated in the different tubes and in the different sets, sections or parts of the apparatus may therefore be adequately provided for.

Figure 3:
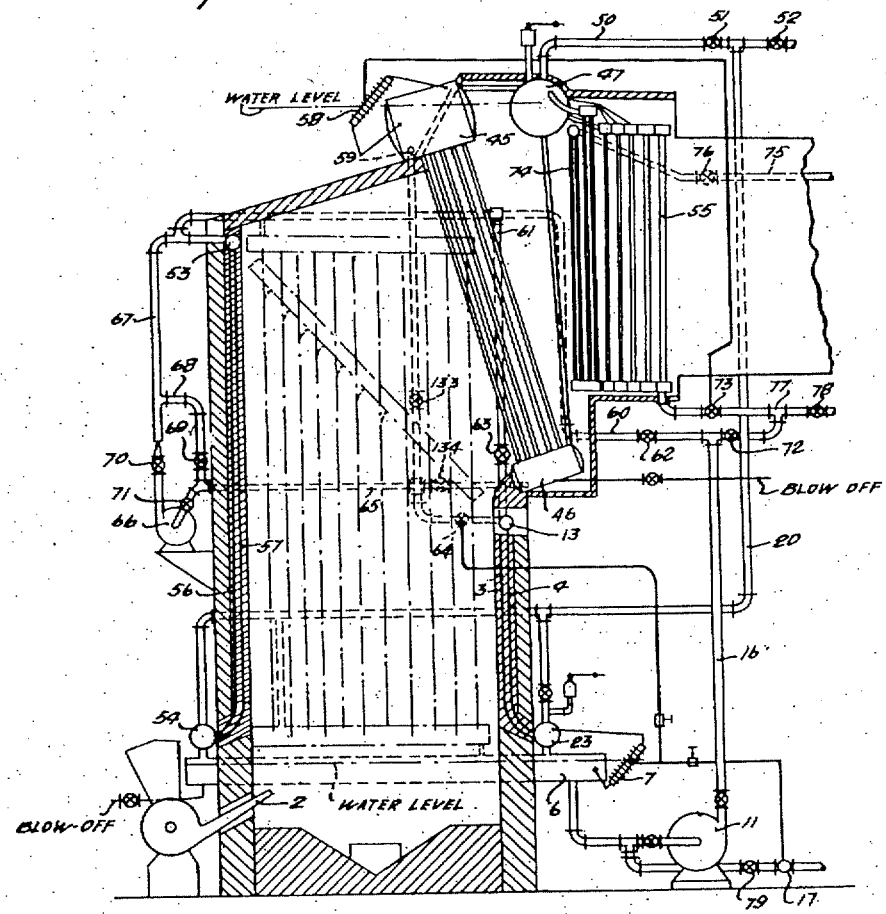
Fig. 3 is a diagrammatic section through a structure comprising a boiler of common type and a furnace having tubes for absorbing radiant heat arranged according to the present invention.

Water walls may be combined with various types of boilers of which two types of water tube boilers are shown in Figs. 1 and 3 and a combined film tube boiler and water wall is shown in Fig. 2. Various water circulation combinations may be employed and only a few are illustrated in the drawings. The arrangement of the tubes and sections or parts of the heating surface varies with the different shapes of the heat chamber necessitated by the different firing mechanism or other conditions.

More specifically Fig. 1 illustrates a film tube water wall boiler combined with a film tube steam generator of the type described in my Patent Re. 16,895. As described above, the water wall construction is provided with headers 13 and 23 connected by tubes 3 and 4, and the film tube steam generator is similarly provided with headers 83 and 84 connected by tubes 80. The water level in the lower header 84 is controlled by level control 81 which controls feed water input by the valve 82 in series with the control valve 17 operated by the level control 7. As the lower header 84 of the steam generator is connected to the upper header 13 of the water wall boiler and the water circulation pipe 16 connects to the upper headers 83 of the steam generator, the water circulation is in series, first through the steam generator and then through the water wall boiler. Steam is separated in the lower header 84 and passed out through the pipe 85 controlled by the valve 86. Steam from the water wall boiler passes out through the pipe 28 or the pipe 28a as described above. A bypass pipe 87 is provided in order to cause water from the lower header 84 to be bypassed around the water wall boiler when the water in excess of the evaporation in the steam generator is too greatly in excess of that of the water wall boiler.

In Fig. 4 is shown a plug inserted in a tube providing one of the jet orifices which are utilized to produce an even distribution or apportionment of the water or to form a film on the inside of the tubes as described above. The plug 88 provided with the small orifice 89 is merely an illustration of a number of types of orifices which can be embodied in header constructions suitable for the present invention and in no sense limits the invention to the constructions and jet arrangements shown.

Figure 5:
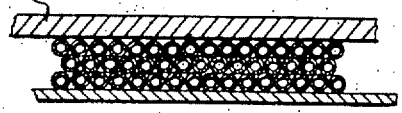
Figure 5 shows in section a typical arrangement of the tubes in the radiant heat zone.

Figure 5 shows a cross section transversely of the lengths of the tubes 3 or 80 in the radiant heat zone. In this figure the tubes are shown relatively closely spaced in the direction parallel to the furnace wall 1. As in Figure 2, a refractory covering may be placed on the furnace side of the tubes. The section shown in Figure 5 may be taken as typical of the arrangement of the tubes in the construction of Figure 2, which is a purely diagrammatic illustration of the relation of the tubes.

The lower header 84 in Fig. 1 is provided with a low water level control 132 which operates the valve 131 in the bypass pipe 130 which bypasses water from the upper header 83 to the lower header. When the water wall boiler takes water from the header 84 faster than water is supplied to the header in the normal series circulation, the water level will fall and when it falls below the level of the control 132, the valve 131 will be opened and sufficient water will be bypassed to maintain the level in the lower header. This prevents failure of water supplied to the water wall boiler tubes and provides the delivery of the water to the two sections or parts of the steam generating apparatus in proper amounts, while utilizing the excess water from one part for delivery to the other part. There is also thus maintained an adequate head of water above the inlet ends of the water wall tubes and above the orifices at this end of these tubes.

The construction shown in Fig. 2 provides a steam generator having an upper header 83 and tubes 80 which, in their upper reaches, are so-called convection generator tubes exposed to the heat of heating gases, but in their lower reaches, as shown at 113, act as water wall tubes exposed to radiant heat. Lower headers 84 collect the steam generated and separate it from the water. The steam passes out through the pipe 85 controlled by the valve 86 and the excess water is circulated through the pump 11 and pipe 16 to the upper header 83. Feed water inlet is controlled by the water level controller 7 operating the valve 17 in the feed water line. In this embodiment the steam generating elements are preferably of the film tube type and relatively small and long tubes which can be easily and efficiently bent into various shapes, so as to lend themselves particularly to combined uses as steam generators and water wall tubes. The resulting structure is very simple and compact and for many installations, particularly where space is at a premium, this modification of the invention is of great importance.

In Fig. 2, which, of course, as in the case of the other figures of the drawings, is merely a diagrammatic illustration, I have shown all of the boiler tubes extending into the heat chamber so that each tube is a combined generating and water wall tube. For many purposes, however, it is desirable to use a larger number of convection steam generator than water wall tubes and in some cases the contrary may be desirable. Where some of the boiler tubes do not act as water wall tubes, a separate lower header or headers should be provided for them as shown in Fig. 1. Where a larger number of water wall tubes is required than boiler tubes, separate upper headers for the excess water wall tubes are provided. The circulation created by pumps or other means may be in series, in parallel, or in series parallel in such combined arrangements.

Fig. 3 shows the combination of a water wall with a single pass water tube boiler in which provision is made for partly or wholly combining the water circulation for the two boilers. The water wall boiler is divided into two portions, a shorter back portion consisting of tubes 3 and 4 and headers 13 and 23, and a longer front section consisting of tubes 56 and 57 and headers 53 and 54. The water tube boiler has an upper drum 45 which is provided with a level regulator 58 and an overflow pipe 59. The main circulating pump 11 circulates water either directly through the header 13 and tubes 3 and 4 by pipes 16, 60 and 61 controlled by valves 62 and 63, or the circulation may be through the feed water heater tubes 55, the drums 47, 46, 45 and through the overflow pipe 59 and control valve 64. Pipe 60 may also feed water directly into header 53 or the feed water for this header may be taken from the overflow through pipes 59, 65, to the pump 66 and from the pump through the pipe 67. This latter pump may also be bypassed by the pipe 68 controlled by the valve 69. In such operation, the two pump shut-off valves 70 and 71 are closed. The steam output of the various sections or parts of the steam generating apparatus may be combined with each other and with the output of the regular boiler.

Water circulation in series through the main boiler and the water wall may be effected in two ways. If valve 133 is closed and valve 134 is opened, the water may circulate through the preheater 55 and the drum 47 to the lower drum 46, and thence through the water walls. If, however, valve 134 is closed and valve 133 is opened, the water circulates from the drum 46 up to the drum 45 and down through the pipe 58. In this latter case, the positive pump circulation aids the water circulation in the main pass of the water tube boiler as well as in the preheater.

When the valve 72 is open, causing water to be circulated through the feed water heater 55, the flow may be controlled from the water level 58 by means of a valve 73 and this control may then regulate the circulation both of the water tube boiler and the water wall boiler.

In the arrangement shown in Fig. 3, feed water may be introduced into the water wall circulation system through valve 17. Additional feed water for the water tube boiler may be introduced through pipe 77 and valve 78 and this introduction may be in addition to the water circulated by means of the pump 11 or if the valve 72 is closed, the feed water may be introduced into the feed water heater 55 without admixture of water from the pump 11. In either event, the water introduction may be controlled by the valve 73 actuated from the water level control 58. Feed water make-up for both the water wall boiler and the water tube boiler may be introduced through pipe 78 by closing the feed water control valve 79 so that no feed water is introduced into the circulation of the pump 11. The proportions of feed water from both sources may also be varied by suitable adjustment of the valves 78 and 79. In the installation shown in Fig. 3, therefore, the water wall boiler may be run as an independent unit without connection to the water tube boiler or it may be given a common circulation with separate feed water inputs or a common circulation with a single feed water input. Other combinations can be effected by a simple provision of valves to control the separate sections or parts as shown.

It will be clear from the above description in connection with Fig. 3 that in accordance with the present invention provision is made for delivery of the water in excess of the steam generated in one section or part of the steam generating apparatus from said part to another part of the steam generating apparatus. It will also be clear that there is provided control of the amount of water so delivered, as well as control of the amount of water delivered to the whole apparatus or to sections thereof in relation to the steam generated in one or more of said sections; also control such that the sections each receive their proper amount of water preferably in excess of the steam generated therein. By suitable operation of the valves 62, 72 and 73 the amount of water circulated and delivered directly to the water wall and the amount delivered to the boiler may be controlled. Also the amount delivered to the boiler for delivery therethrough to the water wall may be varied and controlled. Similarly by suitable operation of the valves 133, 134 and 64 the amount of water delivered from the boiler to the water wall may be varied and controlled. Such amounts may be in excess of the amount of steam generated in the water wall and if the flow of the water is in series through the boiler and the wall the amount delivered to the boiler or to the water wall may then be in excess of the steam generated in both sections of the steam generating apparatus. As in Fig. 1, the valve 84 connected with the water level device 7 constitutes a means of controlling the flow of the water to one part of the steam generating apparatus from another part thereof in accordance with variations in a condition of the water flow in the circulation of the water. This condition of the water flow may be that of the series circulation through the two parts of the steam generating apparatus or may control the flow of the water flowing in series between the parts.

The invention has been described particularly and in detail in connection with water walls and boilers using water as the cooling agent and steam generating material. The invention is, however, in no sense limited to the use of water and any other suitable liquid may be used. The invention has been described in connection with diagrammatic drawings which show the principle of the invention applied to several types of boilers. In any particular installation, of course, the structural features must be adapted to the installation and to the operating conditions and the various commonly used accessories such as water purifiers, various types of feed water injector pumps or steam injectors, and the like, may be necessary or advantageous in some cases and it is not intended that the invention should be considered as limited to the diagrammatic or skeleton boiler shown, but on the contrary, it will be clear to those skilled in the art that in installing water walls and boilers embodying the present invention, the usual arrangement and installation structure is to be followed in accordance with the best steam engineering practice.

The principles of the present invention, however, may be applied in various modifications which will be clear to those skilled in the art and which are included in the invention.

What is claimed is:

1. Steam generating apparatus comprising a furnace for the combustion of fuel, a gas passage connected to said furnace through which the combustion gases from the furnace pass, a plurality of steam generating tubes surrounding said furnace to absorb the radiant heat thereof and extending into said gas passage to form a bundle of tubes to absorb the heat of the gases by convection, means for positively effecting the delivery of water to one end of each of said tubes, and means for insuring uni-directional flow of the water through the tubes toward the other end thereof together with the generated steam.

2. Steam generating apparatus comprising a furnace for the combustion of fuel, a gas passage connected to said furnace through which the combustion gases from the furnace pass, a plurality of steam generating tubes surrounding said furnace to absorb the radiant heat thereof and extending into said gas passage to form a bundle of tubes to absorb the heat of the gases by convection, means for positively delivering to the tubes at one end thereof water in excess of the steam generated therein, and means for apportioning the water to the tubes at said end and causing it to flow uni-directionally through each tube in excess of the steam generated therein under the action of both radiant and convection heat.

3. Steam generating apparatus comprising walls forming a furnace for the combustion of fuel, a gas passage connected to said furnace through which the combustion gases from the furnace pass, a plurality of parallel steam generating tubes extending along a wall of said furnace and passing into said gas passage to form therein a bundle of tubes, means for delivering water to one end of said steam generating tubes, means for causing the water to flow uni-directionally through the tubes toward the other end thereof, and means for discharging the steam generated in said tubes from said other end thereof.

4. Steam generating apparatus comprising walls forming a furnace for the combustion of fuel, a gas passage connected with said furnace through which the combustion gases from the furnace pass, a plurality of steam generating tubes extending along the wall of said furnace in parallel arrangement and passing into said gas passage to form therein a bundle of tubes, means for delivering water to said steam generating tubes at the ends thereof in the gas passage remote from the furnace, and means for causing the water to flow uni-directionally through the tubes and to be discharged from the other ends thereof together with the steam generated in said tubes.

5. Steam generating apparatus comprising a steam generating tube exposed to the heat of heating gases, a steam generating tube exposed to the radiant heat of a furnace, means for delivering water in excess of the steam generating capacity of the steam generating apparatus to one end of said tube exposed to the heating gases, means restricting the delivery of water to said tube exposed to heating gas to insure unidirectional flow of the steam and water through said tube, means for discharging from the other end of said tube the steam generated therein together with the water in excess of said generated steam, means for delivering said excess water to one end of the tube exposed to radiant heat, means restricting the delivery of water to said tube exposed to radiant heat to insure unidirectional flow of the steam and water through said tube, means for discharging from the other end of said tube exposed to radiant heat the steam generated therein together with the water in excess of said steam, and means for returning to the water inlet end of said tube exposed to the heat of the heating gases the excess water discharged from the tube exposed to the radiant heat.

6. Steam generating apparatus comprising a steam generating tube exposed to the heat of heating gases, a steam generating tube exposed to the radiant heat of a furnace, means for delivering to one end of one of said tubes water in excess of the steam generating capacity of the steam generating apparatus, means for discharging from the other end of said tube the steam generated therein together with the water in excess of said generated steam, means for delivering said excess water to one end of the other tube, means associated with at least one of the tubes for limiting the quantity of water delivered to said tube to an amount insufficient to fill the cross sectional area of said tube throughout any substational portion of its length, means associated with the other of said tubes restricting the amount of water delivered to the tube, said water limiting and restricting means being constructed and arranged to insure unidirectional flow of the water successively through said tubes and means for discharging from said other tube the water in excess of the steam generated therein.

7. Steam generating apparatus comprising a steam generating tube exposed to the heat of heating gases, a steam generating tube exposed to the radiant heat of a furnace, means for delivering water in excess of the steam generating capacity of the steam generating apparatus to one end of said tube exposed to the heating gases, means at said end of said tube for limiting the quantity of water delivered to said tube to an amount insufficient to fill the cross-sectional area of said tube throughout any substantial portion of its length, means for discharging from the other end of said tube the steam generated therein together with the water in excess of said generated steam, means for delivering said excess water to one end of the tube exposed to radiant heat, means at said end of said tube exposed to radiant heat for limiting the quantity of water delivered to said tube to an amount insufficient to fill the cross-sectional area of said tube throughout any substantial portion of its length, means for discharging from the other end of said tube exposed to radiant heat the steam generated therein together with the water in excess of said steam, and means for returning to the water inlet end of said tube exposed to the heat of the heating gases the excess water discharged from the tube exposed to the radiant heat.

8. Steam generating apparatus having a part of its steam generating surfaces exposed to the heat of heating gases and a part thereof exposed to radiant heat, at least one of said parts being in the form of a plurality of steam generating elements, means for positively delivering water to said elements at least in excess of the steam generated in said elements, means for delivering said excess water to the other part of said surfaces, and means restricting the flow of water through the parts arranged with respect thereto to cause unidirectional flow of the water both through said elements and through said other part.

9. Steam generating apparatus having part of its steam generating surfaces exposed to the heat of heating gases and a part thereof exposed to radiant heat, said parts comprising a plurality of steam generating elements, means for positively delivering to one of said parts water at least in excess of the steam generated in said part, means for causing the excess water from said part to flow through the other part, means for restricting the flow of the water through the elements for causing unidirectional flow of the water therethrough to maintain flow in series through said parts, and means for returning to the first part of the steam generating surfaces any excess water discharged from said other part.

10. Steam generating apparatus having a plurality of continuous heating elements each exposed in part to radiant heat and in part to the heat of heating gases, means for positively delivering water to one end of each element, means at said end of the elements for causing the water to flow unidirectionally through the elements toward the other end thereof, said positive delivering means being arranged to deliver the water in excess of the steam generated in said elements under the action of both radiant heat and the heat of the heating gases, means adjacent said part of said elements exposed to radiant heat to form a heat-confining furnace wall, and means associated with the remaining part of said elements providing a passage for heating gases to flow therethrough.

11. Steam generating apparatus having a plurality of continuous heating elements each exposed in part to radiant heat and in part to the heat of heating gases, means for positively delivering water to one end of each element in excess of the steam generated in said element, and means associated with said end of the elements for apportioning to and causing to flow uni-directionally through the elements an amount of water in excess of the amount of steam generated in the elements under the action of both the radiant heat and the heat of the heating gases.

12. Steam generating apparatus having a plurality of continuous heating elements each exposed in part to radiant heat and in part to the heat of heating gases, means for positively delivering water to one end of each element in excess of the steam generated in said element, and means associated with said end of each element for insuring the delivery to and flow through each element of an amount of water in excess of the amount of steam generated in each element under the action of both the radiant heat and the heat of the heating gases.

13. Steam generating apparatus having a plurality of continuous heating elements, each exposed in part to radiant heat and in part to the heat of heating gases, means for positively delivering the water to one end of each element in excess of the steam generated in said element, and orifices at said end of each element for delivering into each element such a portion of the water delivered to said ends of the elements as to flow through said element in excess of the steam generated therein under the action of both radiant heat and the heat of heating gases.

14. Steam generating apparatus having its steam generating surface arranged in a plurality of separate parts, one of said parts being exposed to the heat of heating gases and another of said parts being exposed to radiant heat, means for positively delivering to one of said parts water in excess of the steam to be generated therefrom in said apparatus, means for causing the excess water discharged from said part of the steam generating surface after passage thereover to be delivered to and to flow over the other part of the steam generating surface, and means restricting the delivery of the water through each of said parts to cause the water to flow unidirectionally through said parts in succession.

15. Steam generating apparatus having its steam generating surface arranged in a plurality of separate parts, one of said parts being exposed to radiant heat and another of said parts being exposed to the heat of heating gases, means for positively delivering water to one of said parts of the steam generating surface and causing it to flow thereover in excess of the steam generated on said part of the steam generating surface, means for delivering said excess water to the other part of said surface, and means restricting the delivery of water through said parts so as to cause it to flow unidirectionally thereover in succession.

16. Steam generating apparatus having its steam generating surface arranged in separate parts, one part of said steam generating surface being arranged to absorb a considerable portion of the heat for steam generation under the action of radiant heat, means for positively delivering water to the steam generating surface including means restricting the delivery of the water so as to cause it to flow successively over the separate parts thereof unidirectionally and in excess of the steam generated therefrom, said excess water after passage over the separate parts of the steam generating surface being discharged therefrom and returned to its point of delivery to the steam generating surface.

17. Steam generating apparatus having part of its steam generating surface exposed to the heat of the combustion gases from a furnace and part thereof exposed to the radiant heat of the furnace, means for delivering to the steam generating surface exposed to the heat of the combustion gases water in excess of the steam generated on said surface, means for delivering to the steam generating surface exposed to radiant heat the excess water discharged from said steam generating surface exposed to convection heat and means restricting the water flow through the parts for producing in both parts a unidirectional flow of the water flowing successively through the parts.

18. Steam generating apparatus having part of its steam generating surface exposed to radiant heat of a furnace and part thereof exposed to the heat of the heating gases from the furnace, means for delivering water to one end of the part of the steam generating surface exposed to the heat of the heating gases and causing it to flow thereover toward the other end of said part of said surface in excess of the steam generated thereon, means for delivering at least a part of said excess water to one end of the part of the steam generating surface exposed to radiant heat, and means restricting the flow of the water over said parts to cause it to flow thereover toward the other end of each part of said surface without return flow over said part.

19. Steam generating apparatus having part of its steam generating surface exposed to radiant heat and part thereof exposed to the heat of heating gases, means for delivering water to one of said parts of the steam generating surface in excess of the steam generated in the steam generating apparatus, means for delivering to the other part of said steam generating surface and for causing to flow thereover the water in excess of the steam generated in said part to which the water is first delivered, means for discharging from said other part of the steam generating surface the water in excess of the steam generated on said part, means so restricting the flow of water through said parts as to prevent return flow in said parts and to insure flow of the water successively through said parts, and means for returning to said part of the heating surface to which the water is first delivered the excess water discharged from said other part of the heating surface.

20. Steam generating apparatus having part of its steam generating surface exposed to the heat of heating gases and a part thereof exposed to radiant heat, means for delivering water to one of said parts of the steam generating surface and causing it to flow therethrough in excess of the steam generated therein, means for delivering to the other part of the steam generating surface the excess water after flowing through said first mentioned part, and means restricting the water flow through said parts arranged with respect to said parts so as to cause the water to flow through said parts without return flow in said parts.

21. Process of generating steam which comprises causing the water to be evaporated to flow in parallel paths and successively in a given order in heat exchanging relation to a source of radiant heat and to heating gases, said water being caused to flow at least in excess of the steam generated therefrom while flowing in the heat exchanging relation into which it is first delivered, and so restricting the flow of the water flowing in said heat exchanging relations as to insure that the water is apportioned to the parallel paths and is caused to flow in said paths successively in said order of heat exchange relation.

22. Process of generating steam which comprises causing water to flow in heat exchanging relation to a source of radiant heat in a quantity in excess of the steam generated during said flow, causing water to flow in heat exchanging relation to heating gases in a quantity in excess of the steam generated during said flow, delivering the excess water discharged from flowing in one of the heat exchanging relations to flow in the other heat exchanging relation, and so restricting the flow of the water as it flows in said heat exchanging relations as to insure unidirectional flow of the water in each of said heat exchanging relations and successive flow of the excess water through said heat exchanging relations.

23. Process of generating steam which comprises causing water in excess of the steam generated therefrom to flow successively in a given order in heat exchanging relation to a source of radiant heat and to a source of heat in the form of heating gases, dividing the flow of the water so as to cause it to flow in parallel paths while flowing in heat exchanging relation to each of said sources of heat, and so restricting the flow of the water as it flows in said heat exchanging relations as to apportion the water to said parallel paths and to cause it to flow therein unidirectionally and successively in said heat exchanging relations.

24. Process of generating steam which comprises causing water in excess of the steam generated therefrom to flow in heat exchanging relation to a source of radiant heat and to a source of heat in the form of heating gases, causing at least a part of the water in excess of the steam generated during its flow in heat exchanging relation to one of said sources of heat to be delivered into and to flow in heat exchanging relation to the other source of heat, so restricting the amount of water flowing in said heat exchanging relations as to cause unidirectional flow thereof throughout said heat exchanging relations and varying the amount of water flowing in heat exchange relation to one source of heat to vary the amount of water flowing in heat exchange relation to the other source of heat.

25. Steam generating apparatus having a part of its steam generating surfaces exposed to the heat of heating gases and a part thereof exposed to radiant heat, said parts each comprising a plurality of steam generating elements, means for delivering water in excess of steam generated in the steam generating apparatus to one of said parts at one end of each of the elements in said part, means at said ends of said elements restricting the delivery of the water into the different elements for causing uni-directional flow through said elements of water delivered thereto, and means for delivering the water in excess of the steam generated in said part to said other part including means arranged to restrict the flow of water in the elements of said other part so as to insure uni-directional flow through the elements of said other part.

26. Steam generating apparatus having part of its steam generating surfaces exposed to the heat of heating gases and a part thereof exposed to radiant heat, said parts being composed of a plurality of steam generating elements, means for positively delivering to one of said parts water at least in excess of the steam generated in said part, means for causing said excess water from said part to flow through the other part, and means for restricting the flow of the water through the elements for causing unidirectional flow of the water therethrough to maintain flow in series through both said parts.

27. Process of generating steam which comprises delivering water into and so restricting the flow as to cause it to flow without return flow in heat exchanging relation to two different sources of heat, and so varying the amount of water delivered into said heat exchanging relations that as the water delivered to one of said heat exchanging relations is decreased the amount of water delivered to the other heat exchanging relation is increased and as the amount of the water delivered to said first heat exchanging relation is increased the amount of water delivered to said other heat exchanging relation is decreased.

28. Process of generating steam which comprises causing water to flow successively in a given order in heat exchanging relation to a source of radiant heat and a source of heat in the form of heating gases and at least in excess of the steam generated therefrom while flowing in the heat exchanging relation into which it is first delivered, so restricting the flow of the water as it flows in said heat exchange relations as to insure flow thereof successively in said relations without return flow therein, and varying the amount of said excess water flowing from said first heat exchanging relation to said successive heat exchanging relation to vary the relation of the water quantities flowing in said heat exchanging relations.

29. Process of generating steam which comprises causing water to flow successively in a given order in heat exchanging relation to a source of radiant heat and to a source of heat in the form of heating gases and in excess of the steam generated therefrom while flowing in at least one of said heat exchanging relations, so restricting the flow of the water as it flows in said heat exchange relations as to insure flow thereof successively in said relations without return flow therein, and so varying the amount of water delivered into said heat exchanging relations that as the water delivered to one of said heat exchanging relations is decreased the amount of water delivered to the other heat exchanging relation is increased and as the amount of the water delivered to said first heat exchanging relation is increased the amount of water delivered to said other heat exchanging relation is decreased.

30. Steam generator comprising a plurality of water tubes, means for positively delivering water to said tubes and causing it to flow in each tube toward one end thereof, said tubes each having a part of its continuous length exposed to radiant heat and having a part of its length exposed to heating gases passing thereover, said parts exposed to radiant heat being arranged in relatively close relation to intercept the radiant heat, each of said parts exposed to the gases being formed and being so arranged in a gas passage and with respect to the other parts exposed to the heating gases as to provide a plurality of like extending portions of said parts over which said gases flow in heat exchanging relation thereto, whereby the steam generated in each tube is generated from water heated consecutively by radiant and convection heat.

31. Steam generator comprising a plurality of tubes subjected to steam generating heat, means for positively delivering water to the tubes in excess of the steam generated in the steam generator, means for distributing the water to the tubes and causing it to flow in each tube toward the discharge end thereof, said tubes being connected at their outlet ends to a steam and water separating space, each tube throughout its length subjected to heat providing a single path of fluid flow, each tube having a part of its length exposed to radiant heat and a part of its length exposed to the heat of heating gases, said parts exposed to radiant heat being arranged in relatively closely spaced relation to form a radiant heat intercepting waterwall, said tubes being bent relative to each other and relative to the parts erposed to the radiant heat to position said parts exposed to heating gases in such relation to each other as to provide for flow of the heating gases thereover and to form a bundle of tubes for absorption of heat from the gases by convection.

32. Steam generating apparatus having its steam generating surface divided into two parts, means for delivering to one of the parts of the steam generating surface water in excess of the steam generated thereon, means for delivering to the other part of said steam generating surface the excess water discharged from said part to which the water is first delivered in said excess, means restricting the water flow through said parts arranged with respect to said parts so as to cause the water to flow through said parts without return flow in said parts, and means for by-passing around at least one of the parts of the steam generating surface at least some of the water delivered thereto.

33. Steam generating apparatus having its steam generating surface divided into two parts, means for delivering to one of the parts of the steam generating surface water in excess of the steam generated thereon, means for delivering to the other part of said steam generating surface the excess water discharged from said part to which the water is first delivered in said excess, means restricting the water flow through said parts arranged with respect to said parts so as to cause the water to flow through said parts without return flow in said parts, and means automatically controlled in accordance with variations in the amount of said excess water delivered from one of said parts of the heating surface to the other to by-pass a portion of the water delivered to one of said parts of the heating surface and to deliver it directly to the other part of said heating surface.

34. Steam generating apparatus having its steam generating surfaces divided into two separate parts, means for delivering to one of the parts of the steam generating surface water in excess of the steam generated thereon, means for delivering to the other part of said steam generating surface the excess water discharged from said part to which the water is first delivered in said excess, means restricting the water flow through said parts arranged with respect to said parts so as to cause the water to flow through said parts without return flow in said parts, and means actuated in accordance with variations in the relation between the amount of water delivered to one of the parts of the steam generating surface and the amount of steam generated in one of said parts to control the amount of water delevered to one of said parts.

35. Steam generating apparatus having its steam generating surface divided into separate parts, means for delivering water to each of said parts so as to flow therethrough, means for delivering from one of said parts to the other any water in excess of the steam generated in said first mentioned part, means restricting the water flow through said parts arranged with respect to said parts so as to cause the water to flow through said parts without return flow in said parts, and means actuated in accordance with a reduction in the amount of said excess water flowing from said first mentioned part to the other part to deliver directly to said other part water to maintain said delivery to said other part.

36. Steam generating apparatus having its steam generating surface divided into two separate parts, means for delivering water to each of said parts so as to flow therethrough, means for delivering from one of said parts to the other part any water flowing through said first mentioned part in excess of the steam generated therein, means restricting the water flow through said parts arranged with respect to said parts so as to cause the water to flow through said parts without return flow in said parts, and means brought into operation by an increase in the amount of excess water delivered from said first mentioned part to said other part to limit the delivery of water to said other part.

37. A steam generating appartus having its steam generating surfaces divided into two separate parts, means for circulating water in series through said parts in a completely closed circuit including said parts and in excess of the steam generated in the steam generating apparatus, means restricting the water flow through said parts arranged with respect to said parts so as to cause the water to flow through said parts without return flow in said parts, and means actuated in accordance with variations in the amount of water passing from one part to another to control between predetermined limits the amount of water flowing between said parts.

WALTER DOUGLAS LA MONT.